United States Patent
Frazer et al.

(10) Patent No.: US 6,264,568 B1
(45) Date of Patent: Jul. 24, 2001

(54) BOOT ARRANGEMENT FOR A CONSTANT VELOCITY JOINT

(75) Inventors: Richard D. Frazer, Berkley; Crittenden Bittick, Madison Heights, both of MI (US)

(73) Assignee: GKN Automotive, Inc.

( * ) Notice: Subject to any disclaimer, the term of this patent is extended or adjusted under 35 U.S.C. 154(b) by 0 days.

(21) Appl. No.: 09/635,322

(22) Filed: Aug. 9, 2000

(51) Int. Cl.$^7$ .................................................... F16D 3/84
(52) U.S. Cl. ..................... 464/173; 464/173; 464/175; 277/635
(58) Field of Search ............................ 464/170, 173, 464/175; 277/635, 634; 74/566

(56) References Cited

U.S. PATENT DOCUMENTS

| | | | |
|---|---|---|---|
| 2,308,073 | * 1/1943 | Hagerty | 464/175 |
| 3,204,427 | * 9/1965 | Dunn | 464/175 |
| 3,858,412 | * 1/1975 | Fisher et al. | 464/173 |

* cited by examiner

Primary Examiner—Lynne H. Browne
Assistant Examiner—Aaron Dunwoody
(74) Attorney, Agent, or Firm—Mick A. Nylander

(57) ABSTRACT

A boot arrangement is provided for use with a constant velocity joint and shaft assembly including a shaft, a first joint part slidably engageable with the shaft, and a second joint part cooperable with the first joint part to transmit torque therebetween. The boot arrangement includes a sleeve adapted to slidably engage the shaft and having first and second ends. The second end of the sleeve is adapted to be connected to the first joint part. The arrangement further includes a boot having a first end adapted to be connected to the sleeve proximate the first end of the sleeve, and a second end adapted to be operatively connected to the second joint part.

6 Claims, 3 Drawing Sheets

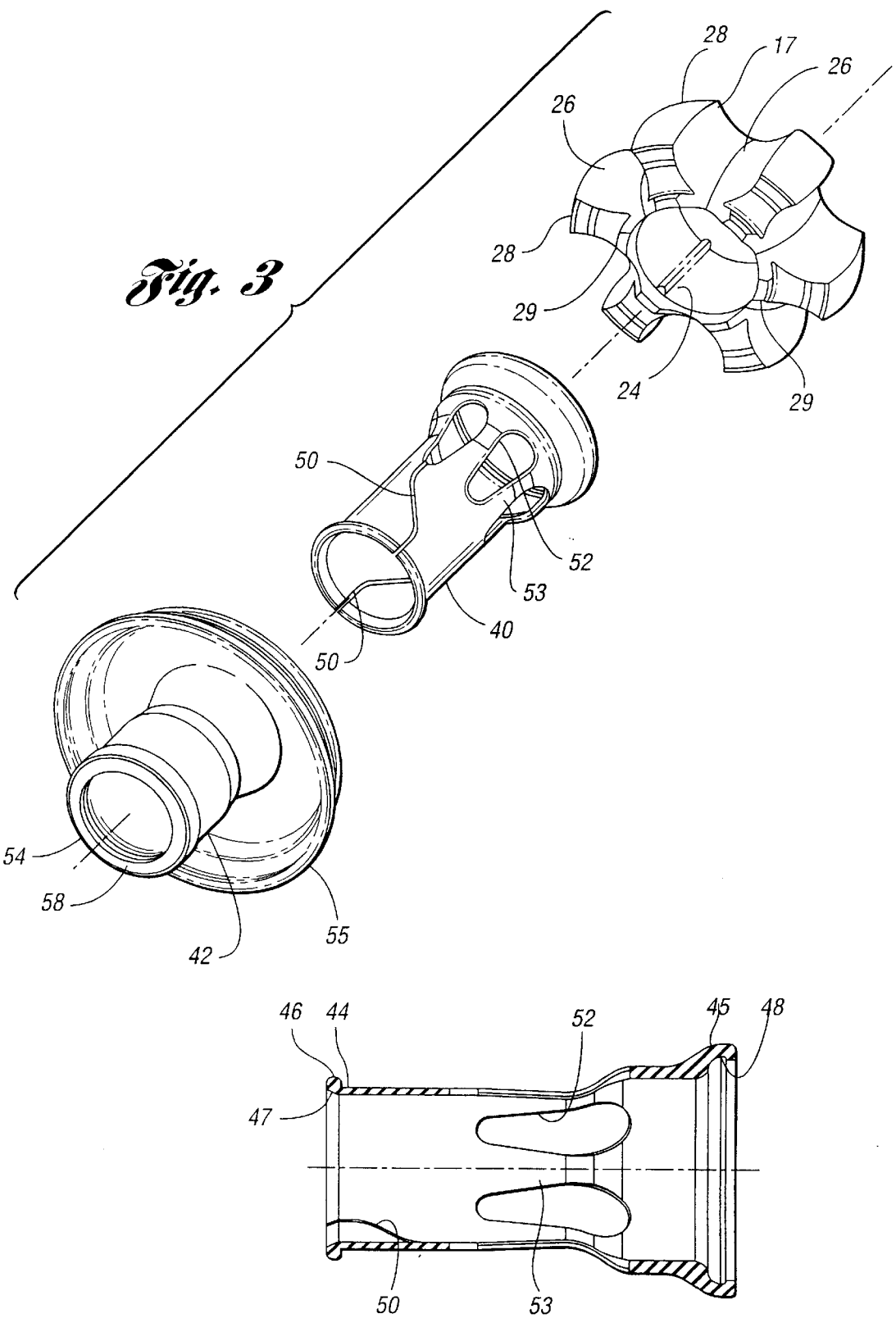

BOOT ARRANGEMENT FOR A CONSTANT VELOCITY JOINT

TECHNICAL FIELD

The invention relates to a boot arrangement for a constant velocity joint and shaft assembly.

BACKGROUND ART

A constant velocity joint and shaft assembly may be provided with a joint having inner and outer races, wherein the inner race is slidable along a splined end of a shaft. A prior boot for use with such an assembly includes a first end fixed to the shaft such as with a clamp, and a second end fixed to the outer race. The boot also includes a plurality of folds that compress together as the inner race is moved in one direction, and expand as the inner race is moved in an opposite direction. This axial deformation of the boot causes undesirable stress on the boot. With such a configuration, the boot is also vulnerable to centrifugal ballooning at high speeds. Furthermore, the boot may also contact the splined end of the shaft when the joint is articulated, thereby subjecting the boot to wear.

DISCLOSURE OF INVENTION

The present invention addresses the shortcomings of the prior art by providing a boot arrangement including a sleeve that is moveable along a shaft, and a boot that is connected to the sleeve and moveable therewith. As a result, axial deformation of the boot can be significantly reduced or eliminated. Furthermore, the sleeve effectively inhibits contact between the boot and the shaft.

Under the invention, a boot arrangement is provided for use with a constant velocity joint and shaft assembly including a shaft, a first joint part slidably engageable with the shaft, and a second joint part cooperable with the first joint part to transmit torque therebetween. The boot arrangement includes a sleeve adapted to slidably engage the shaft and having first and second ends. The second end of the sleeve is adapted to be connected to the first joint part. The arrangement further includes a boot having a first end adapted to be connected to the sleeve proximate the first end of the sleeve, and a second end adapted to be operatively connected to the second joint part.

The sleeve may comprise any suitable material that is sufficiently stiff so that the sleeve will move axially with the inner race when the sleeve is connected to the inner race. For example, the sleeve may comprise nylon reinforced plastic or glass reinforced plastic. The sleeve may also include at least one slot that is configured to allow the sleeve to expand radially. Furthermore, the sleeve may include a plurality of circumferentially distributed apertures disposed between the first and second ends of the sleeve.

While the sleeve and boot may be connected together in any suitable manner, in one embodiment of the boot arrangement the sleeve is provided with a circumferential lip, and the boot includes an annular groove engageable with the lip. Alternatively, the sleeve and the boot may be formed as a single piece.

The boot arrangement of claim may further include a seal connected to the sleeve and adapted to slidably engage the shaft. Alternatively, the boot may be provided with a radially extending annular portion adapted to slidably engage the shaft.

Further under the invention, a constant velocity joint and shaft assembly includes a shaft and a first joint part connected to the shaft such that the first joint part is inoveable along a portion of the shaft. A second joint part is cooperable with the first joint part to transmit torque therebetween. The assembly further includes a sleeve slidably engageable with the shaft, and a boot connected to the sleeve. The sleeve has first and second ends, and the second end is connected to the first joint part such that the sleeve is moveable with the first joint part. The boot has a first end connected to the sleeve proximate the first end of the sleeve, and a second end associated with the second joint part. When the first joint part moves along the shaft, the sleeve moves with the first joint part, thereby causing the boot to move with respect to the shaft.

These and other objects, features and advantages of the invention are readily apparent from the following detailed description of the best modes for carrying out the invention when taken in conjunction with the accompanying drawings.

BRIEF DESCRIPTION OF DRAWINGS

FIG. 3 is an exploded perspective view of the inner race, the sleeve and the boot;

FIG. 4 is a cross-sectional view of the sleeve;

BEST MODES FOR CARRYING OUT THE INVENTION

Figure 1:
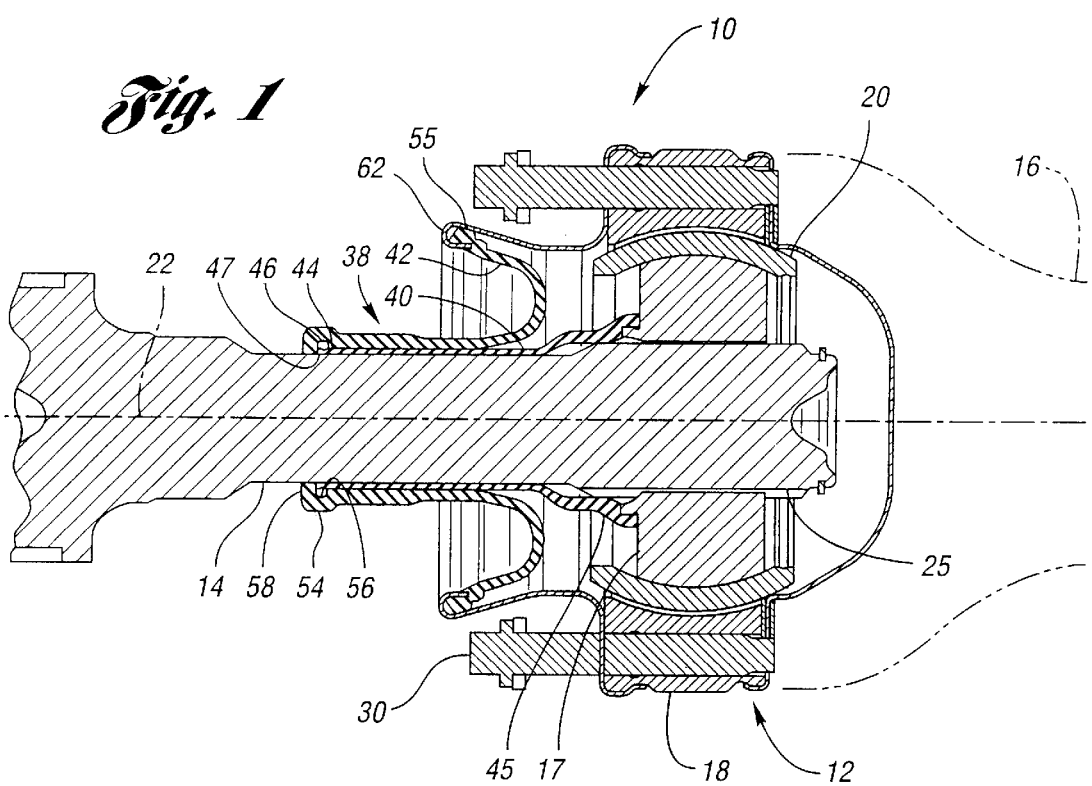
FIG. 1 shows a cross-sectional view of a constant velocity joint and shaft assembly according to the invention and including a constant velocity joint that is axially moveable along a first shaft, and a boot arrangement connected to the constant velocity joint, wherein the boot arrangement includes an inner sleeve and an outer boot connected to the inner sleeve.

FIG. 1 shows a constant velocity joint and shaft assembly 10 according to the invention. The assembly 10 includes a constant velocity joint 12 for transmitting torque between a first shaft 14 and another component such as a second shaft 16. One of the shafts 14 or 16 may be a drive shaft such as a propeller shaft, and the other shaft 14 or 16 may be a driven shaft such as a half shaft. The joint 12 includes a first joint part such as an inner race 17, a second joint part such as an outer race 18, and a ball cage 20 disposed in an annular space between the races 17 and 18. While the joint 12 is configured to operate through a wide range of angles, FIG. 1 shows the races 17 and 18 and ball cage 20 aligned along a common central axis 22.

Figure 2:
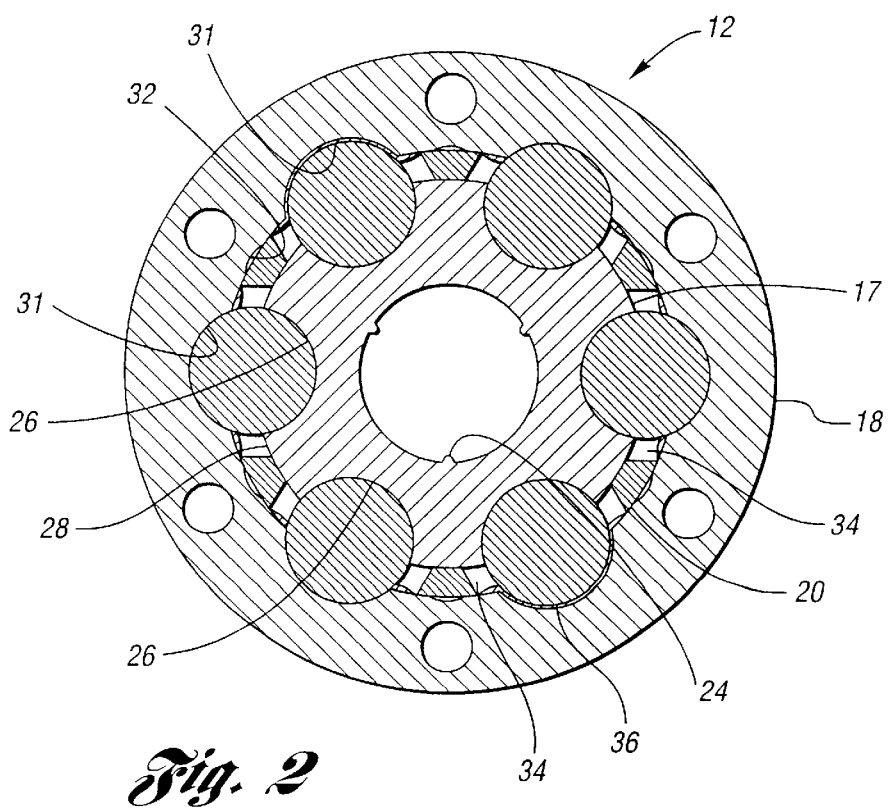
FIG. 2 is a cross-sectional view of the constant velocity joint viewed in the axial direction, wherein the constant velocity joint includes a first joint part or inner race, and a second joint part or outer race.
Figure 5:
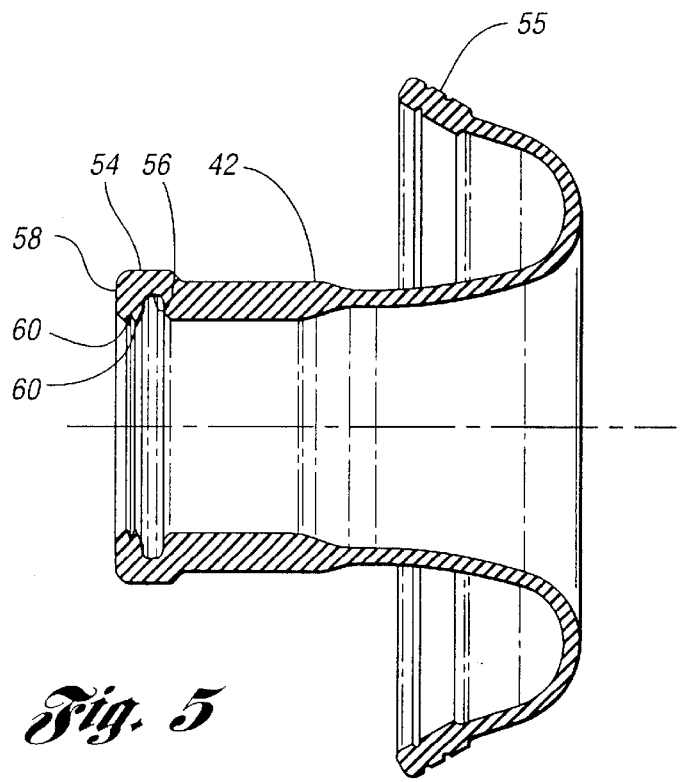
FIG. 5 is a cross-sectional view of the boot.

Referring to FIGS. 1 through 3, the inner race 17 is slidably connected to the first shaft 14 in any suitable manner. For example, the inner race 17 may be provided with a splined opening 24 that mates with a splined outer surface 25 of the first shaft 14. With such a configuration, the inner race 17 may rotate with the first shaft 14, and may also move axially along the first shaft 14. The inner race 17 also has a plurality of first tracks 26 separated by first lands 28. Each first land 28 has an axially extending projection 29.

The outer race 18 is connected to the second shaft 16 in any suitable manner, such as with fasteners 30. Alternatively, the outer race 18 and the second shaft 16 may be formed as a single component. The outer race 16 includes a plurality of second tracks 31 separated by second lands 32.

The ball cage 20 has a plurality of circumferentially distributed windows 34 for retaining a plurality of torque-transmitting balls 36. Each ball 36 is engageable with a pair of first and second tracks 26 and 31, respectively, for transmitting torque between the inner and outer races 17 and 18, respectively.

Referring to FIGS. 1 and 3 through 5, the assembly 10 also includes a boot arrangement 38 according to the invention. The boot arrangement 38 includes an inner member such as a sleeve 40, and an outer member such as a boot 42 connected to the sleeve 40. The sleeve 40 slidably engages the first shaft 14 and has first and second opposite ends 44 and 45, respectively. The sleeve 40 further includes a circumferential ridge or lip 46 and a chamfer 47 disposed proximate the first end 44. The second end 45 of the sleeve 40 is connected to the inner race 17. For example, the second end 45 may be provided with a groove 48 for receiving the projections 29 of the inner race 17, such that the sleeve 40 and the inner race 17 may be snapped together. Alternatively, the sleeve 40 may be provided with an annular projection (not shown), and the inner race 17 may be provided with multiple grooves (not shown) for receiving the annular projection. As yet another alternative, the sleeve 40 may be connected to the inner race 17 in any suitable manner such as with fasteners (not shown).

The sleeve 40 preferably comprises a sufficiently rigid or stiff material so that the sleeve 40 will move axially along the first shaft 14 as the inner race 17 moves along the first shaft 14. For example, the sleeve 40 may comprise nylon reinforced plastic and/or glass reinforced plastic. The sleeve 40 may also be provided with one or more slots 50 that are configured to allow the sleeve 40 to expand radially. With such a configuration, the sleeve 40 may be placed over a portion of the first shaft 14 having a larger diameter than the inner diameter of the sleeve 40.

The sleeve 40 also includes a plurality of apertures 52 separated by lands 53. The apertures 52 allow lubrication to pass between the first shaft 14 and the joint 12. The apertures 52 also reduce contact between the first shaft 14 and the sleeve 40, thereby reducing friction as the sleeve 40 moves along the first shaft 14. The lands 53 inhibit contact between the boot 42 and the inner race 17.

The boot 42 has first and second ends 54 and 55, respectively, and the first end 54 is connected to the sleeve 40 at or proximate the first end 44 of the sleeve 40. Preferably, the boot 42 is provided with an annular groove 56 for receiving the lip 46 of the sleeve 40. Alternatively, the boot 42 and the sleeve 40 may be connected together in any suitable manner. For example, the boot 42 and sleeve 40 may be connected together with a clamp or with an adhesive. The boot 42 also preferably has a seal, such as a radially extending annular portion 58, that is configured to retain lubrication within the assembly 10. Preferably, but not necessarily, the annular portion 58 is provided with a plurality of annular ridges 60.

The second end 55 of the boot 42 is connected directly or indirectly to the outer race 18. For example, the second end 55 may be connected to a boot cover or can 62 that is attached to the outer race 18 in any suitable manner.

The boot 42 may comprise any suitable material that is sufficiently flexible to allow the joint 12 to operate through a wide range of angles. Suitable materials include rubber, silicone or plastic material. Advantageously, rubber and silicone also provide good sealing properties for the annular portion 58.

While the assembly 10 may be assembled in any suitable manner, the sleeve 40 is preferably first snap fit onto the inner race 17 of the joint 12. Next, the boot 42 is placed over the sleeve 40, and the groove 56 of the boot 42 is engaged with the lip 46 of the sleeve 40. The boot can 62 is then crimped to the boot 42. Next, the joint 12 and boot arrangement 38 are mounted on the first shaft 14. Advantageously, the slots 50 allow the sleeve 40 to expand radially so that the sleeve 40 may be moved over the splined outer surface 25 of the first shaft 14. Under an alternative assembly procedure, the sleeve 40 or the entire boot arrangement 38 may be assembled onto the first shaft 14 prior to connecting the sleeve 40 to the inner race 17.

When the assembly 10 is installed in a vehicle, the joint 12 and boot arrangement 38 may be moved axially along the first shaft 14 to facilitate installation. For example, the joint 12 and boot arrangement 38 may be moved axially in a first direction to reduce the overall length of the assembly 1) so that the assembly 10 may be positioned between two components of the vehicle. Once the assembly 10 is properly positioned, the assembly 10 may be extended to a desired length by moving the joint 12 and boot arrangement 38 in a second direction opposite the first direction. The assembly 10 may also be used in applications requiring plunging movement of the joint 12 during operation.

Advantageously, the sleeve 40 allows the joint 12 to slide along the first shaft 14 without requiring compression or extension of the boot 42. As a result, undesirable deformation of the boot 42 may be avoided. Furthermore, as shown in the Figures, the boot 42 may be provided without folds or convolutes. The sleeve 40 also inhibits the boot 42 from contacting the first shaft 14, thereby extending the life of the boot 42.

Figure 6:
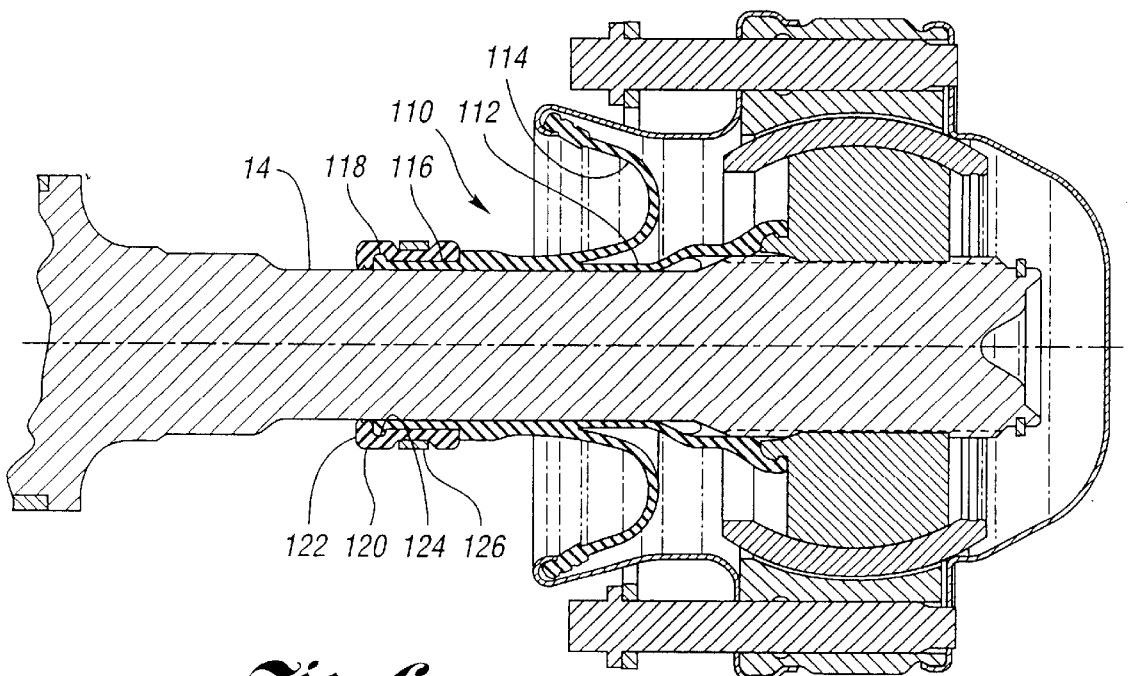
FIG. 6 is a cross-sectional view of a second embodiment of the boot arrangement including a sleeve and a boot formed as a single piece, with a seal connected to the sleeve.

FIG. 6 shows a second embodiment 110 of the boot arrangement including a sleeve 112 and a boot 114 that are formed as a single piece. For example, the sleeve 112 and boot 114 may be formed in a single mold using any suitable material such as a thermoplastic material. Alternatively, the sleeve 112 and boot 114 may be formed separately, and then joined together in any suitable manner. For example, the sleeve 112 and boot 114 may be fused together such as by sonically welding the sleeve 112 and boot 114 together. As shown in FIG. 6, the sleeve 112 and boot 114 cooperate to define a recess 116. Furthermore, the sleeve 112 has a circumferential ridge or lip 118.

The boot arrangement 110 further includes a seal 120 disposed in the recess 116 and having a radially extending annular portion 122 that slidably engages the first shaft 14. The seal 120 has an annular groove 124 that is engaged with the lip 118 so as to connect the seal 120 to the sleeve 112. Alternatively or supplementally, the seal 120 may be connected to the sleeve 112 in any suitable manner such as by an interference fit between the seal 120 and the recess 116, with an adhesive, or with an annular clamp 126. The clamp 126 may also be used to improve contact between the seal 120 and the first shaft 14, while still permitting axial movement of the sleeve 112 along the first shaft 14. While the seal 120 may comprise any suitable material, in a preferred embodiment the seal 120 comprises rubber or silicone.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claim is:

1. A constant velocity joint and shaft assembly comprising:
   a shaft;
   a first joint part connected to the shaft such that the first joint part is moveable along a portion of the shaft;
   a second joint part cooperable with the first joint part to transmit torque therebetween;
   a sleeve slidably engageable with the shaft, said sleeve having first and second ends, the second end is connected to the first joint part such that the sleeve is moveable with the first joint part and at least one slot that is configured to allow the sleeve to expand radially; and
   a boot having a first end connected to the sleeve proximate the first end of the sleeve, and a second end associated with the second joint part;
   wherein when the first joint part moves along the shaft, the sleeve moves with the first joint part, thereby causing the boot to move with respect to the shaft.

2. A constant velocity joint and shaft assembly comprising:
   a shaft;
   a first joint part connected to the shaft such that the first joint part is moveable along a portion of the shaft;
   a second joint part cooperable with the first joint part to transmit torque therebetween;
   a sleeve slidably engageable with the shaft, said sleeve having first and second ends, the second end is connected to the first joint part such that the sleeve is moveable with the first joint part and including a plurality of circumferentially distributed apertures disposed between the first and second ends of the sleeve; and
   a boot having a first end connected to the sleeve proximate the first end of the sleeve, and a second end associated with the second joint part;
   wherein when the first joint part moves along the shaft, the sleeve moves with the first joint part, thereby causing the boot to move with respect to the shaft.

3. The constant velocity joint ard shaft assembly of claim 2 wherein the sleeve has at least one slot extending between one of the apertures and the first end of the sleeve.

4. A constant velocity joint and shaft assembly comprising:
   a shaft;
   a first joint part connected to the shaft such that the first joint part is moveable along a portion of the shaft;
   a second joint part cooperable with the first joint part to transmit torque therebetween;
   a sleeve slidably engageable with the shaft, said sleeve having first and second ends and a lip, the second end is connected to the first joint part such that the sleeve is moveable with the first joint part; and
   a boot having a first end connected to the sleeve proximate the first end of the sleeve, a second end associated with the second joint part and a groove engageable with said lip; and
   wherein when the first joint part moves along the shaft, the sleeve moves with the first joint part, thereby causing the boot to move with respect to the shaft.

5. A constant velocity joint and shaft assembly comprising:
   a shaft;
   a first joint part connected to the shaft such that the first joint part is moveable along a portion of the shaft;
   a second joint part cooperable with the first joint part to transmit torque therebetween;
   a sleeve slidably engageable with the shaft and having first and second ends, the second end is connected to the first joint part such that the sleeve is moveable with the first joint part; and
   a boot having a first end connected to the sleeve proximate the first end of the sleeve, and a second end associated with the second joint part and a radially extending annular portion slidably engageable with the shaft; and
   wherein when the first joint part moves along the shaft, the sleeve moves with the first joint part, thereby causing the boot to move with respect to the shaft.

6. A constant velocity joint and shaft assembly comprising:
   a shaft;
   a first joint part connected to the shaft such that the first joint part is moveable along a portion of the shaft;
   a second joint part cooperable with the first joint part to transmit torque therebetween;
   a sleeve slidably engageable with the shaft and having first and second ends, the second end is connected to the first joint part such that the sleeve is moveable with the first joint part;
   a boot having a first end connected to the sleeve proximate the first end of the sleeve, and a second end associated with the second joint part; and
   a clamp disposed about the boot for connecting the boot and the sleeve together;
   wherein when the first joint part moves along the shaft, the sleeve moves with the first joint part, thereby causing the boot to move with respect to the shaft.

* * * * *